US007328170B2

(12) United States Patent
Jacobs et al.

(10) Patent No.: US 7,328,170 B2
(45) Date of Patent: Feb. 5, 2008

(54) MULTI-DEVICE SUPERVISOR SUPPORT FOR SELF-CHECKOUT SYSTEMS

(75) Inventors: Eric Jacobs, Pointe Claire (CA); Iouri Kloubakov, Beaconsfield (CA); Bruce McVicar, Pincourt (CA); Thierry Leroux-Demers, Longueuil (CA)

(73) Assignee: Optimal Robotics Corporation, Montreal, Quebec (CA)

( * ) Notice: Subject to any disclaimer, the term of this patent is extended or adjusted under 35 U.S.C. 154(b) by 355 days.

(21) Appl. No.: 10/364,838

(22) Filed: Feb. 11, 2003

(65) Prior Publication Data

US 2003/0149630 A1 Aug. 7, 2003

Related U.S. Application Data

(63) Continuation-in-part of application No. 10/060,423, filed on Jan. 30, 2002.

(60) Provisional application No. 60/266,000, filed on Feb. 2, 2001.

(51) Int. Cl.
G06G 1/12 (2006.01)
G06Q 20/00 (2006.01)

(52) U.S. Cl. .............................. 705/21; 705/16; 705/18

(58) Field of Classification Search .................... 705/21
See application file for complete search history.

(56) References Cited

U.S. PATENT DOCUMENTS

| | | | | |
|---|---|---|---|---|
| 4,581,701 A * | 4/1986 | Hess et al. | ..................... | 700/82 |
| 5,083,638 A | 1/1992 | Schneider | ..................... | 186/61 |
| 5,115,888 A | 5/1992 | Schneider | ..................... | 186/61 |
| 5,123,494 A | 6/1992 | Schneider | ..................... | 177/50 |
| 5,125,465 A | 6/1992 | Schneider | ..................... | 177/50 |
| 5,158,274 A * | 10/1992 | Hamada et al. | ............ | 271/9.13 |
| 5,168,961 A | 12/1992 | Schneider | ..................... | 186/52 |
| 5,426,282 A | 6/1995 | Humble | ...................... | 235/383 |
| 5,494,136 A * | 2/1996 | Humble | ........................ | 186/61 |
| 5,510,979 A | 4/1996 | Moderi et al. | .............. | 364/405 |
| 5,825,002 A * | 10/1998 | Roslak | ........................ | 235/375 |
| 5,965,861 A | 10/1999 | Addy et al. | .................. | 235/383 |
| 6,354,498 B1 | 3/2002 | Lutz | ........................... | 235/385 |
| 6,408,279 B1 | 6/2002 | Mason | ........................ | 705/16 |
| 6,483,622 B1* | 11/2002 | Motohashi | ................... | 398/128 |
| 6,502,749 B1* | 1/2003 | Snyder | ........................ | 235/383 |
| 6,522,772 B1* | 2/2003 | Morrison et al. | ........... | 382/124 |
| 6,540,143 B1* | 4/2003 | Matsumori | ............. | 235/462.13 |

(Continued)

FOREIGN PATENT DOCUMENTS

WO WO 99/24929 * 5/1999

OTHER PUBLICATIONS

Anonymous, "Taking retail technology to the next level", Chain Drug Review, vol. 20 No. 19, p. 24, Nov. 1998.*

(Continued)

*Primary Examiner*—F. Zeender
*Assistant Examiner*—Christopher Buchanan
(74) *Attorney, Agent, or Firm*—Clifford Chance US LLP

(57) ABSTRACT

A customer self-checkout system includes one or more checkout stations and multiple supervisor terminals. The supervisor terminals provide support to, and control over, the self-checkout system and checkout stations. The supervisory terminals may be wireless terminals that can capture self-checkout customer identification information including signatures, fingerprints, images, and other forms of identification.

15 Claims, 7 Drawing Sheets

U.S. PATENT DOCUMENTS

| | | |
|---|---|---|
| 6,792,394 B1 * | 9/2004 | Matsko et al. .............. 702/187 |
| 6,854,656 B2 * | 2/2005 | Matsumori ............. 235/472.01 |
| 6,892,183 B1 * | 5/2005 | Cooper et al. ................ 705/16 |
| 2002/0103708 A1 | 8/2002 | Kloubakov et al. ........... 705/21 |
| 2002/0148896 A1 | 10/2002 | Persky et al. ............... 235/383 |
| 2002/0186133 A1 | 12/2002 | Loof ....................... 340/572.1 |
| 2003/0121974 A1 | 7/2003 | Blanford et al. ............ 235/383 |

OTHER PUBLICATIONS

Enz et al. "Best practices in service quality", Cornell Hotel & Restaurant Administration Quaterly, vol. 41 No. 5, Oct. 2000.*

Int'l Search Report dated Aug. 22, 2002 for PCT/CA02/00111.

* cited by examiner

MULTI-DEVICE SUPERVISOR SUPPORT FOR SELF-CHECKOUT SYSTEMS

CROSS-REFERENCE(S) TO RELATED APPLICATIONS

This application is a continuation-in-part of U.S. patent application Ser. No. 10/060,423, filed Jan. 30, 2002, and entitled "Multi-Device Supervisor Support For Self-Checkout Systems" and claims the benefit of the filing date of U.S. provisional application Ser. No. 60/266,000 which was filed on Feb. 2, 2001.

BACKGROUND OF THE INVENTION

Over the past few decades, retail point-of-sale ("POS") systems have been greatly automated to expedite the checkout process. Computer-based POS systems are now common in the retail environment. Such systems include one or more checkout terminals (i.e., checkout stations or computerized "cash" registers) and a database of prices, inventory and other information related to the items for purchase. Each checkout station typically includes a bar code scanner which can detect a machine readable bar code on the packaging to identify a scanned item. When an item is scanned, the scanner sends a signal corresponding to the product number of the item to a data processing component of the POS system, which then obtains from the database information relating to the scanned item such as price and description.

More recently, self-checkout systems (such as the U-Scan Express® available from Optimal Robotics Corp.) have come into use. Self-checkout systems include self-checkout stations (each of which typically includes a bar code scanner with an integrated scale) that allow customers to scan bar codes on the items they are purchasing. The checkout station also has other input and output devices (such as an alphanumeric keypad, a video camera unit and a display). These systems allow customers to directly perform checkout activities such as scanning barcoded items, selecting modes of payment (e.g., credit or debit card), carrying out payment using automated payment accepting means (e.g., credit or debit card readers), and requesting explanations on how to use the checkout station.

The self-checkout station may have a signaling device (e.g., a call button, an "Assist" key on a keypad, a phone, or other device) for use by the customer to request assistance. Assistance may be required when, for example, a non-bar coded item is to be processed. This assistance request may be sent to, and processed at, a supervisory terminal. The supervisory terminal permits a store employee (i.e., a supervisory employee) to perform a range of supervisory activities overseeing and controlling checkout at the self-checkout stations. Supervisory terminal hardware may include, among other things, a video display used to display video images (e.g., from a video camera or other imaging device at a checkout station), a touch screen, a POS keyboard, a PC keyboard, a receipt printer, and a cash drawer.

Supervisory activities include, among others, providing authorization when a customer is purchasing an item not bearing a barcode (such as produce). Prior to making an authorization, the supervisor may make a visual identification of the item and input at a supervisory terminal a code identifying the item. Supervisory activities also include making decisions when the checkout station detects a discrepancy between the actual weight of an item and the expected weight of that item ("weight violation"). Weight violation activities of the supervisor typically involve either clearing the violation to allow the purchase or removing the item from the order (hereinafter, "voiding the item") and asking the customer to try again. A supervisor may also provide explanations to customers on how to use the checkout station and check out items on behalf of the customer, (such as when the items are too heavy or too large to be scanned by a fixed barcode reader mounted on the checkout station or when the customer seeks assistance for completing the checkout). Additional activities include enabling and disabling operations at the checkout stations, video surveillance of the customer activities, use of a cash drawer to accept cash payment and dispense change, printing a cashier receipt, printing end-of-day, end-of-week and end-of-month reports, and other software or system maintenance activities.

In some self-checkout systems, a video monitoring system may also be included to help the supervisor oversee customer checkout activities and to assist the customer. A video camera unit at the self-checkout station can be used, e.g., to capture an image of a non-bar coded item for display at the supervisor station. This allows the supervisory employee to view the item and enter the appropriate code.

A number of different user interface modes can be made available on the supervisory terminals. For example, the U-Scan Express system supports "Direct" and "Mini Direct" interface modes to carry out functions such as checkout and voiding of items on behalf of the customer. The Direct Mode interface displays a graphical keyboard using a touch screen at the supervisory terminal. This graphical keyboard replicates the keyboard at the checkout station. The supervisor user can carry out most functions normally executed at a cash register by using (touching) the graphical keyboard keys. A special key may be provided to close Direct Mode and return to normal operations on the supervisory terminal. Direct Mode allows the supervisor to carry out POS operations, including those not required or supported by a self-checkout system, without leaving physical proximity of the supervisory terminal and without having an actual POS terminal mounted on the supervisory terminal.

Another supported interface, known as a Mini Direct Mode interface, uses a display that allows the supervisor to carry out POS operations such as reporting and other functions which may not be supported by a self-checkout station, while retaining a display interface used to supervise the self-checkout stations. A visual indicator (e.g., change of background color on the display) tells the user that Mini Direct Mode is active. In the Mini Direct Mode, input from an actual POS keyboard, mounted on the supervisory terminal, may be accepted. The user can carry out substantially all functions normally available at a checkout station by use of the POS keyboard. A special graphical key may be provided for closing Mini Direct Mode and returning to normal operations on the supervisory terminal.

A number of self-checkout systems are described in, e.g., U.S. Pat. Nos. 5,083,638; 5,115,888; 5,123,494; 5,125,465 and 5,168,961.

SUMMARY OF THE INVENTION

The present invention provides a self-checkout system. The system includes one or more customer members (i.e., checkout stations), and any number of supervisory members (i.e., supervisory terminals). Each supervisory terminal is operated to conduct a corresponding set of supervisory activities over operations at the checkout stations.

The supervisory terminal has a network interface for communicating with at least one checkout station through at least one of an electrical medium, a radio frequency (RF)

medium and an optical medium. A self-checkout system can support multiple types of supervisory terminals, such as fixed supervisory terminals and mobile supervisory terminals (implemented, e.g., using a hand-held computer coupled to a wireless network). In addition, implementations may include specialized supervisory terminals with limited user input devices. For example, a "pager size" supervisory terminal, small enough to be worn comfortably by a user, can be used to provide an alerting signal to a store employee. The supervisor thus knows when to return to the physical proximity of the system.

Multiple supervisory terminal implementations can be made available to allow the supervisory employee to use a selected supervisory terminal with the highest convenience or utility under a specific set of circumstances. The multiple supervisory terminals can include a stationary supervisory terminal, specialized stationary supervisory terminal, a mobile supervisory terminal, and a compact mobile warning supervisory terminal. Each terminal type can be offered with a variety of different input and display peripherals. For example, the terminals can include keypads, touch screens, still video and motion video input devices, signature capture interfaces, and biometric input devices such as fingerprint sensors.

Different supervisory terminal implementations can provide improved flexibility for providing supervisory activities over the self-checkout system. For example, if a weight violation occurs at one checkout station while the supervisor is physically located at another checkout station, the supervisor need not walk back to the stationary supervisory terminal to provide supervisory activity. Instead, the supervisor may clear the weight violation by swiping a transponder card in front of a transponder card reader mounted on a specialized stationary terminal located near or on the checkout station. If, at the same time, a different checkout station requires a non-barcoded item approval while the supervisor is still providing support over the weight violation, the supervisor, with line-of-sight view of the non-barcoded item, can e.g., pick up a mobile supervisory terminal from his or her shirt pocket to provide the approval.

A supervisory communications controller can control communications between checkout stations and supervisory terminals to prevent the processing of conflicting supervisory signals (e.g., if different supervisors at different supervisory terminals enter conflicting control over a customer terminal). Similarly, if a customer signature is required, and the self-checkout station being used by the customer does not include an operational signature capture device (either because of device failure or because the station simply lacks signature capture), then a message can be transmitted to one or more mobile stations that do include a signature capture input device and the user can provide the signature at a mobile supervisory terminal.

The ability of the supervisor to choose between multiple supervisory terminals with different physical characteristics allows for quicker response to situations that require supervisor intervention. This can reduce the time spent by the customer at the self-checkout station and the time spent by the supervisor on each order. This coordination of supervisory activities also allows the supervisor to reduce idle time spent watching the system while stations are not in use. This is achieved by selecting the supervisory terminal which meets the demand of the situation in terms of movement and efficiency of the human-machine interface. For instance, using the mobile warning supervisory terminal, the supervisor may leave the physical proximity of the self-checkout system when customers are not present or when no supervisor activity is needed. This allows for more efficient utilization of supervisory employee resources.

Each supervisory terminal in the self-checkout system may provide a corresponding one of various combinations of mobility and functional completeness with regards to the set of possible supervisory activities. At any point in time, a supervisory employee may choose from among the available supervisory terminals in order to provide a response to situations that require supervisor intervention.

In some implementations, such as handheld supervisory terminals, a simplified user interface mode (referred to herein as "Tiny Direct Mode") can be used to process input from a supervisor. The Tiny Direct Mode interface is suitable for use with reduced-size input devices. For example, a 14-key keypad (including a "Cancel," a "Void," a "Clear," a "Enter" and ten digit keys) can be used. Tiny Direct Mode implements a system of simple prompts allowing a supervisor to control a range of checkout station operations using the reduced-size input device. Tiny Direct Mode implementations may process input using the steps of (a) displaying information on why a code entry is required, (b) detecting entry of digits corresponding to a code, (c) detecting a Cancel command and, when the Cancel command is detected, canceling a current operation, (d) detecting a Void command and, when the Void command is detected, voiding the code, (e) detecting a Clear command and, when the Clear command is detected, clearing the digits detected in step (b), and (f) detecting an Enter command and, when the Enter command is detected, entering the digits detected in step (b) as the code.

The details of one or more embodiments of the invention are set forth in the accompanying drawings and the description below. Other features, objects, and advantages of the invention will be apparent from the description and drawings, and from the claims.

DETAILED DESCRIPTION OF THE INVENTION

Figure 1:
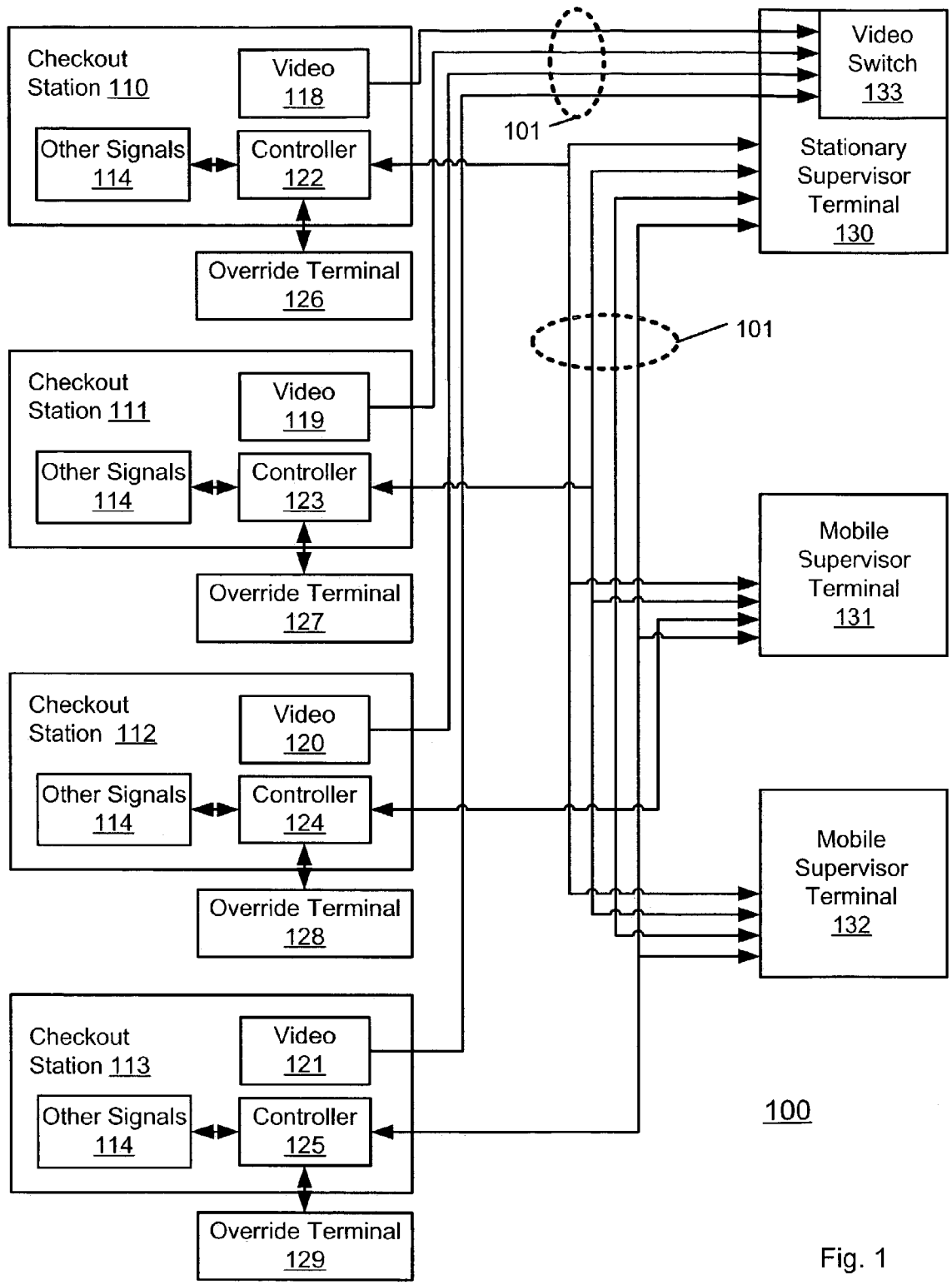
FIGS. 1 and 2 show block diagrams of self-checkout systems.
Figure 2:
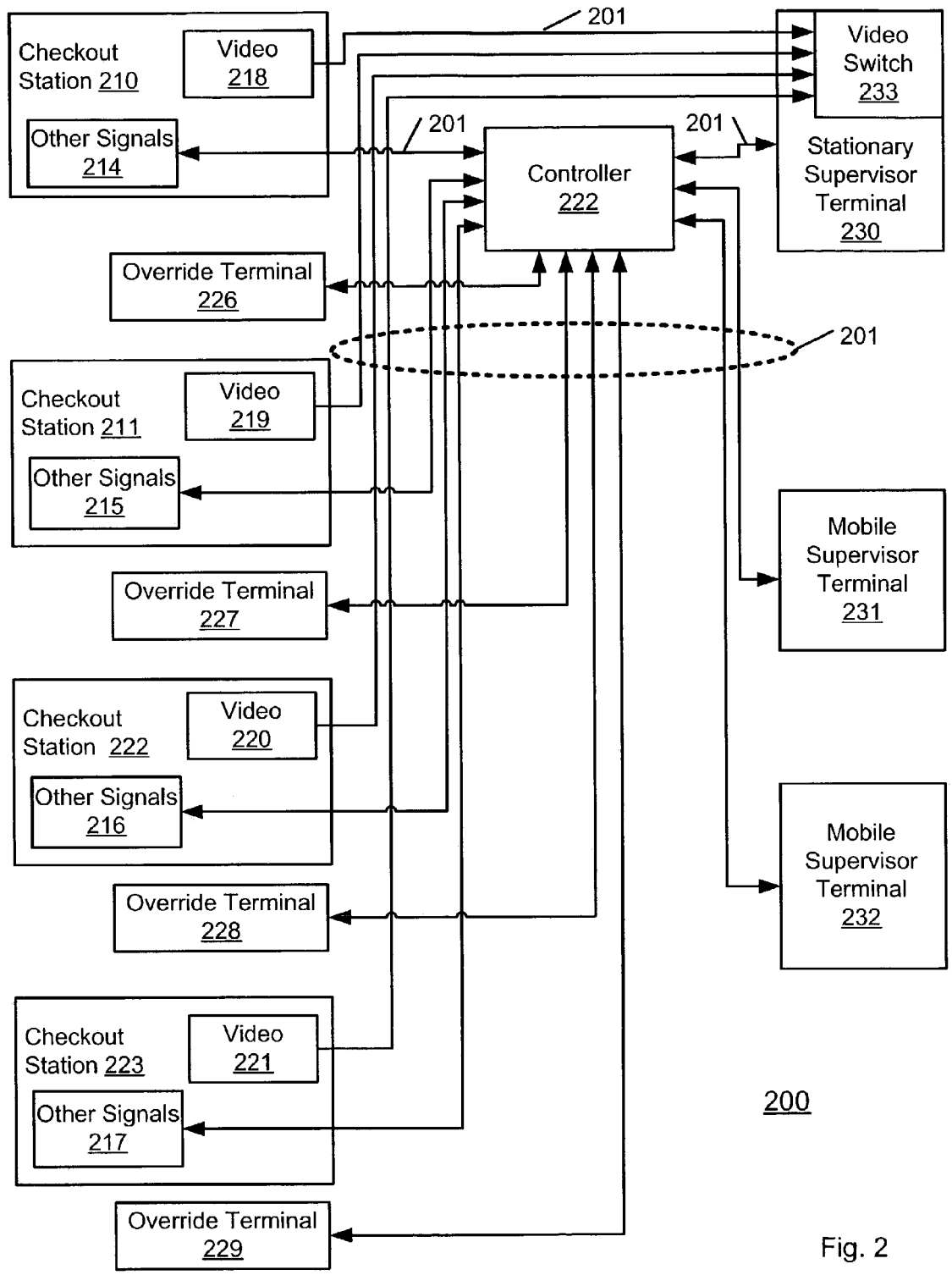

Self-checkout systems 100 of FIG. 1 and 200 of FIG. 2 can include one or more checkout stations 110-113, 210-213 which are each coupled to multiple supervisory terminals 126-132, 226-232. Each of the supervisory terminals can exert supervisory control over the checkout stations. Terminals 126-132, 226-232 can include small terminals 126-129, 226-229 mounted on or near the checkout station, as well as "full-sized" terminals 130, 230 mobile 131, 231, and pager-sized terminals 132, 232. In some cases, a terminal (e.g., 126-129, 226-229) may have a dedicated function, such as clearing transactions. For example, the terminal 126 may have a transponder-card reader allowing a supervisor to simply swipe a security card to clear a transaction.

To coordinate the control of the checkout stations by supervisory terminals, and to prevent conflicting control instructions, the control signals exchanged between the checkout stations and supervisory terminals are managed by a supervisory communications controller 122-125, 222. FIG. 1 shows an implementation in which the controller 122-125 is local to each station 110-113, while FIG. 2 shows an implementation in which a centralized controller 222 is used. The local controller 122-125 may be an integrated element of the checkout station's hardware and software system while the controller 222 may be coupled to the checkout station by a data network (e.g., an Ethernet, Token Ring, or IEEE 802.11b network).

When supervisory control over a checkout station is required, the checkout station's signal processor circuitry 114-117, 214-217 (which may include, e.g., a microprocessor, data storage and other hardware, software, and associated interfaces) generates a supervisory request message that is transmitted to the supervisory communications controller 122-125, 222. The supervisory request message can include data indicating the nature of the requested supervisory assistance. For example, the supervisory request message may include parameters indicating that the message was generated in response to a customer pressing a "Help" button or upon detection of a weight violation at the checkout station. Other supervisory activities may also be reported. The communications controller then distributes the supervisory request message to the supervisory terminals (in some implementations, the message format or contents may be modified and message parameters processed at the communications controller 122-125, 222 prior to such distribution).

Referring now to FIG. 1, the self-checkout system 100 includes both local supervisory terminals 126-129 and shared terminals 230-232. The local terminals 126-129 are directly connected to a corresponding one of the checkout stations 110-113 via the station's local communications controller 122-125, respectively, and can exercise control over the directly connected checkout station. Shared supervisory terminals 130-132 are each coupled to multiple checkout stations and can switch between, and assert control over, the multiple checkout stations 110-113. When a supervisory action is required at a checkout station, e.g., station 110, signals (i.e., data messages) are sent from the station's controller 122 to its local terminal 126 as well as to each of the shared supervisory terminals 130-132. The signal can be processed at the supervisory terminal to generate an alert informing a supervisor of the need for assistance. The signal may also identify the specific action requested. In some implementations, the controllers 122-125, 222 manage interaction with the multiple supervisory terminals to allow a first reply from a supervisory terminal to be accepted in response to the request for assistance.

Referring now to FIG. 2, as in system 100, the self-checkout system 200 includes both local supervisory terminals 226-229 and shared terminals 230-232. However, in the system 200, coordination of supervisory activities controlling and assisting customer checkout is provided using a common centralized communications controller 222 in place of the multiple local controllers 122-125. The supervisory terminals 226-232 communicate with the checkout stations 210-213 through the central controller 222.

A communications controller 122-125, 222 can communicate a request to supervisory terminals 130-132, 230-232 such that the shared supervisory terminals 130-132 and 230-232 each receive the request. To do so, a "broadcast" request may be used. Alternatively a communications controller 122-125 or 222 may generate and send a unique message to each of the terminals. The controllers 122-125, 222 may also route request to local terminals 126-229, 226-229 such that only the terminal directly connected to the requesting customer station will receive the request. The controller then waits for a response from a supervisory terminal. If responses are generated by multiple supervisory terminals (e.g., if multiple supervisors each attempt to respond), the communications controller will perform an arbitration function to determine the response or responses used to control the checkout station. In one implementation, the controller may simply accept a response from the first responding supervisory terminal. In some cases, additional responses may also be accepted if they do not conflict with the first response and are still relevant, but will be ignored if the responses are no longer relevant (such as a weight violation that has already been cleared). Alternatively, timeout mechanisms may be used to determine when an outstanding request is no longer relevant. For example, after the first broadcast of a supervisory request message, the controller may re-broadcast the request every 100 milliseconds until a supervisory terminal provides a response. If a supervisory terminal does not receive at least one request from the terminal within a timeout window (e.g., a 500 millisecond window), a time-out will occur. That is, the supervisory terminal will infer that the request was responded to by another supervisory terminal and, therefore, will no longer accept input responsive to the timed-out request (i.e., the request will be removed from a list of outstanding request maintained by the supervisory terminal). In the case of system 100, the supervisory terminals communicate responses directly back to the checkout station's communications controller while in the system 200 responses flow back through the central controller 222.

As an example, a broadcast request message may be distributed to supervisory terminals 126 and 130-132, thereby alerting multiple supervisors of the customer's need for assistance. After the broadcast request is transmitted, the controller 122 will wait for a first one of the supervisory terminals to respond to the request (i.e., to accept the request). In some implementations, upon receiving notice of an accepted broadcast request from a first terminal (e.g., terminal 132), the controller 122 may send a message to non-accepting terminals (e.g., 126, 130-131) canceling the outstanding broadcast request. This prevents an outdated supervisory request from remaining displayed at the non-accepting terminals 126, 130-131. Once a broadcast request is accepted by a terminal, the controller 122 may store data identifying the accepting supervisory terminal to thereafter manage the flow of data between the customer checkout station 110 and that supervisory terminal.

Supervisory activity over a checkout station can also be initiated at any of the shared supervisory terminals 130-132, 230-232 or at a checkout station's local supervisory terminals 126-129, 226-229. This may be done without the need for a request for supervisory activity from the checkout station. Control of a checkout station may be initiated at a supervisory terminal using a switch, button, software functions or other checkout station selector to select the checkout station under control. For example, FIG. 5, described below, shows an interface allowing selection of one of four checkout lanes (i.e., checkout stations) to be controlled. The supervisory terminal will thereafter initiate contact with the checkout systems to be controlled. In the system 100, the supervisory terminal 130-132 will initiate communication directly with the controller 122-125 of the selected station 110-113. In a centralized controller system 200, the terminal 126-132 will communicate the request to the controller 222 which will thereafter coordinate supervisory activity and will initiate and provide the communication of signals between the supervisory terminal and the corresponding checkout station 210-213. In some implementations, a supervisor may switch between checkout stations being controlled at any point in time using the checkout station selector.

Different controller implementations may use different algorithms, or modes, to distribute and coordinate signals among the supervisory terminals and the checkout stations. In some implementations, all supervisory terminals can be active at the same time. Thus, the supervisory employee can use any one without constraints or delays. Any supervisory terminal can also be disabled to prevent passers-by from making unauthorized or inadvertent use of the system. In addition, the supervisory employee can enable a disabled terminal before using it. Activation can be explicit, such as by use of a key or entry of a password, or may be implicit, such as by swiping a transponder or magnetic card at a reader on terminal 126-129, 226-229 to void an item.

The supervisory terminals have input devices (e.g., keypads, touch screens, buttons or switches), used by the supervisor to start and stop using the terminal. The input generates corresponding signals to be received by the supervisory communications controllers 122-126, 222 over a communications network 101, 201. In response, the communications controller can either accept input from the supervisory terminal or reject the attempt to connect (the particular response may depend on the current mode of operation). Controller 122-126, 222 and system 100, 200 implementations may support different modes of coordination among the checkout stations and supervisory terminals. Representative modes of coordination include simultaneous, mutually exclusive, preemptive and mixed.

In a simultaneous coordination mode, all supervisory terminals in the self-checkout system 100, 200 may be active for use. Accordingly, there is no specific signal generated when the supervisor decides to switch between them. In a mutually exclusive mode, only one supervisory terminal is active to control a checkout station at a time. Thus, in the mutually exclusive mode, a supervisory terminal can accept and process commands for a checkout station only when no other supervisory terminal is active to control that checkout station. A display or other visual indicator to indicate the state of the terminal as active or inactive can also be included. Preemptive mode is a variation of the mutually exclusive mode. In the preemptive mode, an attempt to activate one supervisory terminal causes the controller 122-126, 222 to attempt to deactivate any currently active supervisory terminal. This attempt may fail (i.e., the controller 122-126, 222 may reject this attempt) if the currently active supervisory terminal is processing an activity that cannot be interrupted and declines the attempt. A mixed mode is essentially either a mutually exclusive mode or a preemptive mode with the feature that certain other specific supervisory terminals may be allowed to be active simultaneously. For example, a mixed mode may be entered for a compact mobile warning supervisory terminal 132 to warn the supervisor of the beginning of customer activity at a checkout station 110.

Specialized stationary supervisory member 126-129, 226-229 may be provided for circumstances in which the supervisor is, for example, in physical proximity to the checkout station. A supervisor may use terminals 126-129, 226-229 by, e.g., swiping a transponder card in order to authorize a weight violation. Other input devices such as a keypad or keyswitch may also be used in a terminal 126-129, 226-229. In some implementations, for example, in FIG. 1, each terminal 126-129, 226-229 may be dedicated to providing support over a specific checkout station. In other implementations, the terminals 126-129, 226-229 may control multiple checkout stations.

The systems 100, 200 can support a range of supervisory terminal types, each of which may provide different sets of functions. For example, full-function stationary terminals 130, 230, mobile terminals 131, 231, and special-function compact pager-like terminals 132, 232 can be used. The mobile supervisory terminal 131, 231 may be based on a laptop or hand-held, battery-powered computer with a barcode reader, a touch screen, a sound generator and wireless communications capability. A compact mobile warning supervisory terminal 132, 232 may also be provided. The features supported by a particular terminal type can vary depending, e.g., on size, cost, power, convenience, security, or other reasons.

A compact mobile warning supervisory terminal 132, 232 may be implemented using a pager-sized device. A pager-sized terminal 132, 232 is battery powered and communicates wirelessly with the self checkout system via wireless network interface 101, 201. In some cases, each communication controller 122-125, 222 may also have an interface to a standard pager network allowing signals exchanged over a conventional pager network to be used. Terminals 132, 232 may have the ability to display a small string of text, or may include a vibrating or other audio/visual device. e.g., an indication of operations at the self-checkout system. Indications may be generated, e.g., upon use of a checkout station or on request for supervisory activity from a checkout station 110. The pager-sized device may be used, e.g., for general surveillance purposes (e.g., to alert a supervisor of activity when the supervisor is not in physical proximity to a checkout station).

Figure 3:
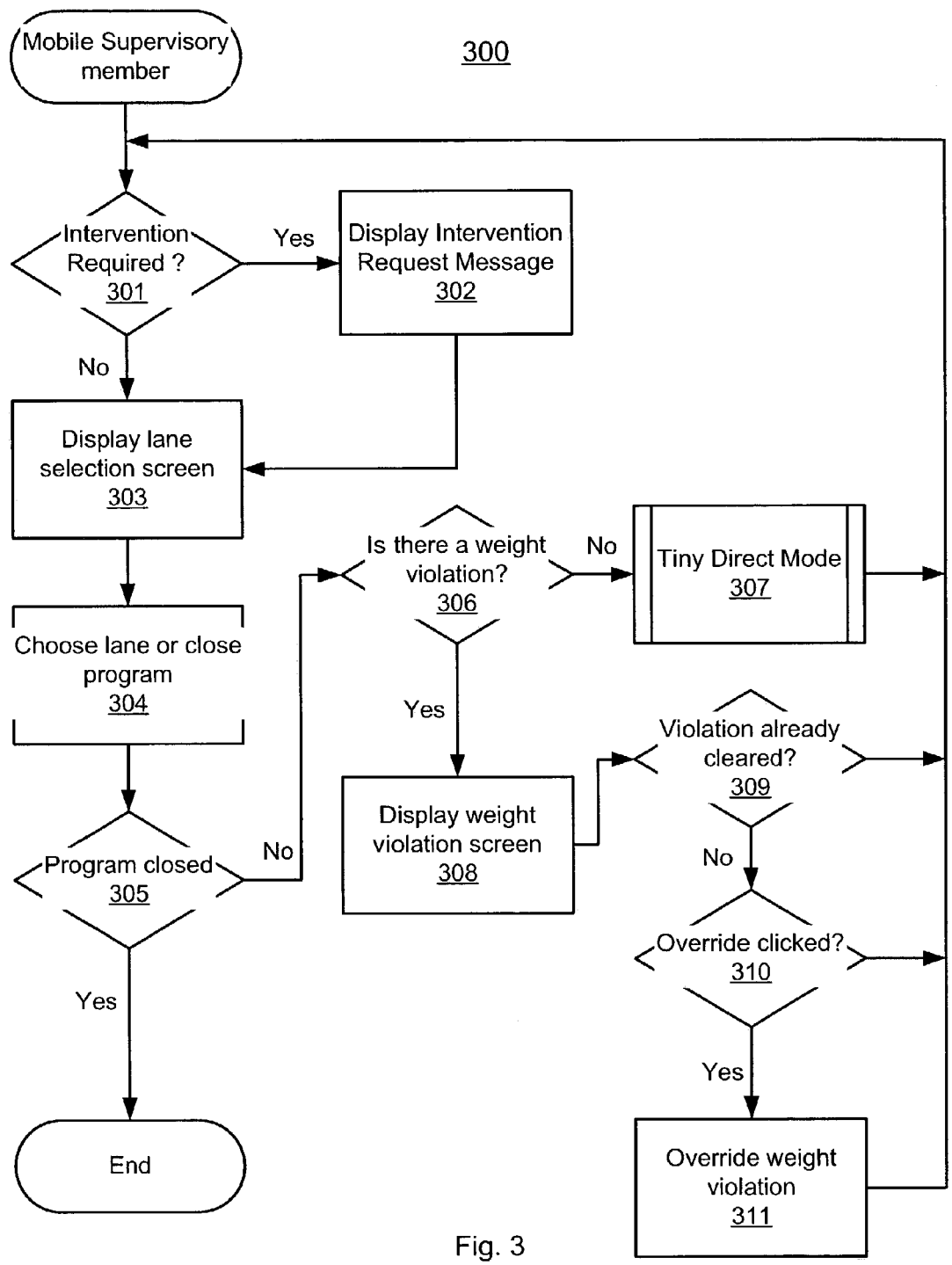
FIG. 3 shows a flow chart of a method for providing a mobile supervisory terminal interface.
Figure 4:
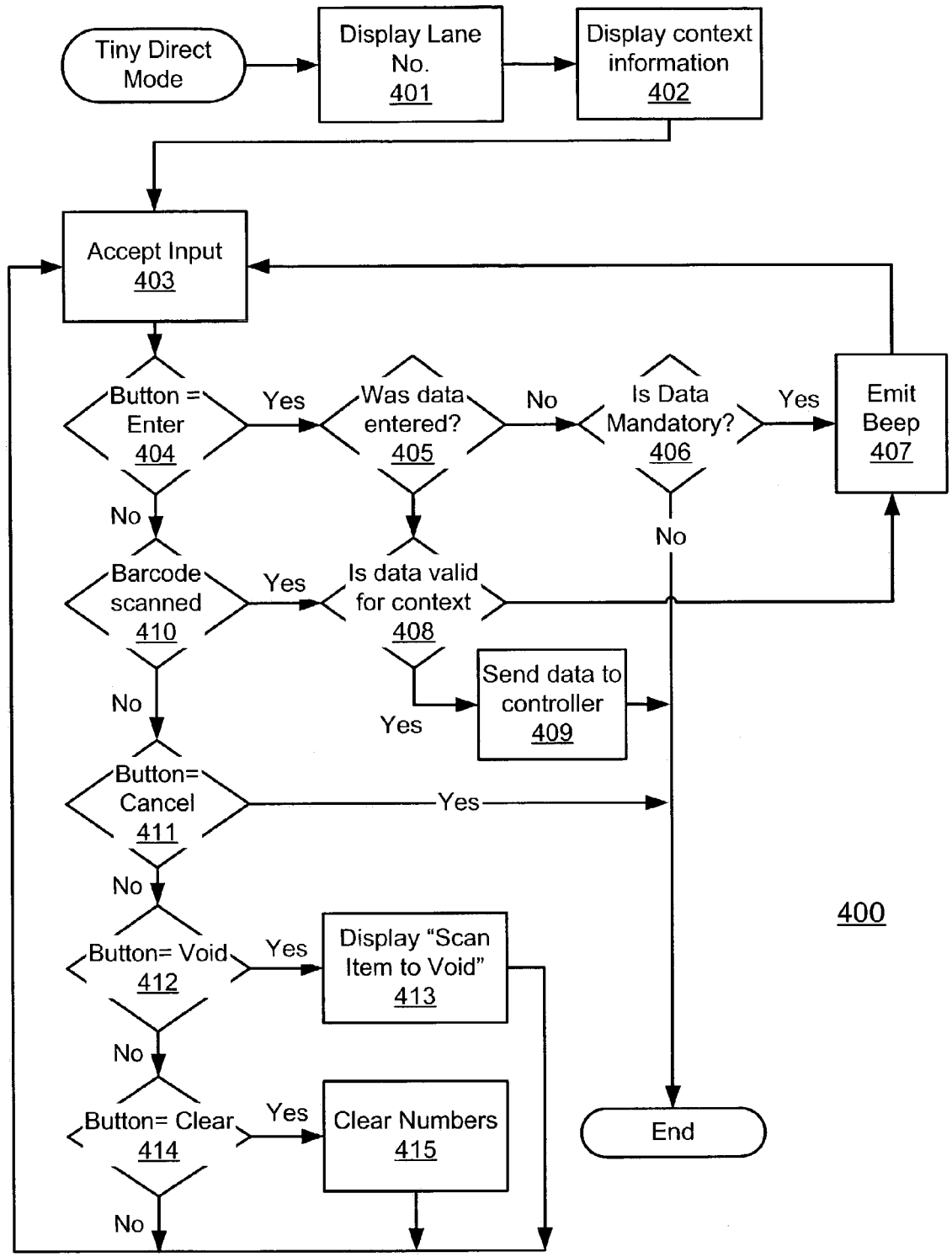
FIG. 4 shows a flow chart of a method for providing supervisory support in a self-checkout system.

In some implementations, a supervisory terminal may be equipped with a relatively limited selection of interface devices. For example, a mobile or pager-sized device may use the reduced-sized keypad of FIG. 7 rather than a full-sized POS keyboard. In such implementations, the system 100, 200 may provide context-sensitive prompting to support a range of supervisory inputs using the keypad 700. FIGS. 3 and 4 illustrate supervisory control processes that can be used to process supervisory inputs using a terminal with a reduced-sized input device.

Figure 5:
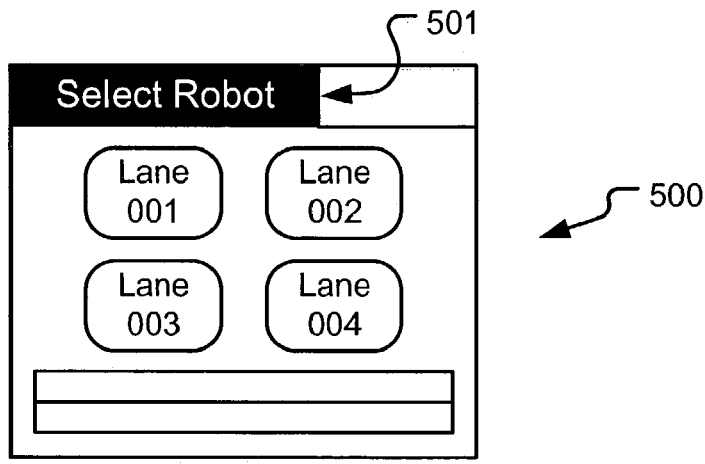
FIG. 5 shows an exemplary lane selection screen.
Figure 6:
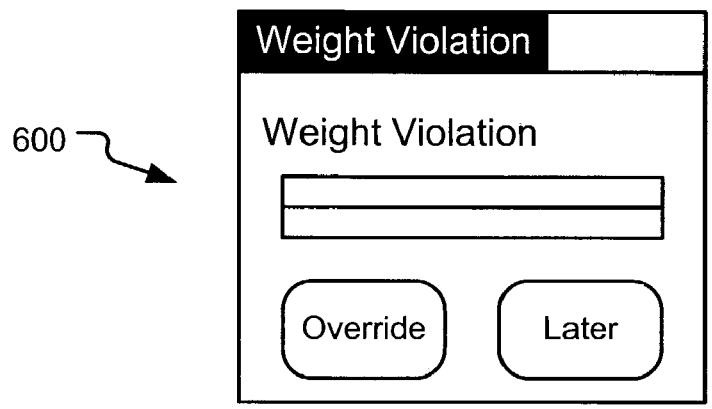
FIG. 6 shows an exemplary weight violation screen.
Figure 7:
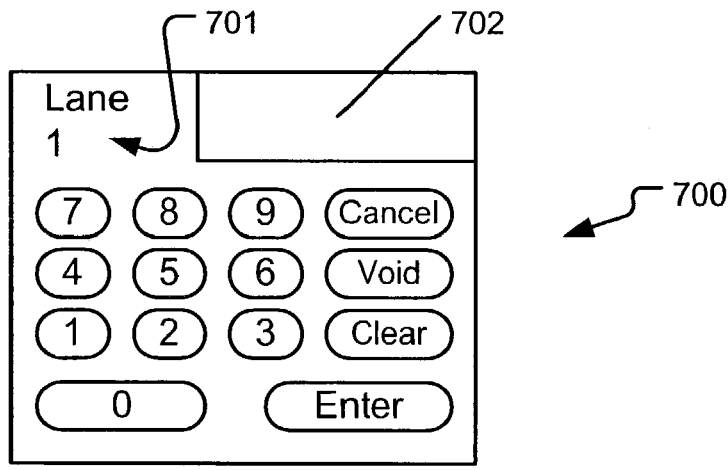
FIG. 7 shows a graphical 14-key keypad.

FIGS. 3 and 4 are flow charts showing data processing steps that may be used in implementations of a system 100, 200 to process supervisory data and control checkout stations. The processes 300, 400 are suitable for use with limited display and input capability supervisory terminals. For example, a terminal using a simple touch screen interface may be used. FIGS. 5-7 show representative touch-screen interface displays that can be used on a handheld mobile terminal. The processes 300, 400 enable display of supervisory request to, and processing of inputs by, a supervisor, using the displays 500, 600, 700.

The processes 300 is initiated when the supervisory terminal is activated (i.e., when it is turned on). An initial step performed by the terminal is to determine whether intervention of a supervisor is required (step 301). This determination may be made, e.g., based on data exchanged with communication controller 122-126, 222 to determine whether there are any outstanding supervisory request. If intervention is not required, a lane (i.e., checkout station)

selection screen 500 may be displayed, allowing the supervisor to initiate control over a checkout station. On the other hand, if supervisory intervention is required, a message requesting intervention is displayed at the supervisory terminals (step 302). The terminal may then display the lane selection screen 500 allowing the supervisor to accept the request or to initiate control of a different terminal (step 303). If there is an outstanding intervention request, a text display area 501 of the screen 500 may display an indication of the request.

If there is an outstanding request, then, using keys 700 on the terminal, the supervisor can either ignore the request, select the lane to be serviced, select an alternative lane to control, or close the program (i.e., reject the request)(step 304). If the supervisor rejects the request (i.e., selects a "close the program" function or reject key) (step 305), a corresponding signal is sent to the controller 122-126, 222 and the terminal is returned to a normal operations mode. In some implementations, the controller 122-126, 222 may route a rejected request to a different one of the supervisory terminals or re-initiate the request.

On the other hand, if the supervisor accepts a request for service from a lane, the terminal determines whether the request relates to a simple transaction, such as a weight violation, that can be displayed and responded to using a fixed display interface, or whether more complex prompting will be needed (step 306). If, for example, there is a weight violation, a weight violation screen 600 (FIG. 6) is displayed (step 308). The interface 600 may remain displayed until the violation is cleared by the customer or from another supervisory terminal (step 309). Clearing of the violation by another can be determined based on messages exchanged between the terminal and controller 122-126, 222. A supervisory response, including selecting an "Override" or "Later" function, can be entered using interface 600. If "Override" is selected (step 310), a signal is sent to the controller 122-126, 222 to override the weight violation (step 311). If the violation was already cleared or after the supervisor selects "Later" or "Override", processing resumes at step 301. In some implementations, other requests may be processed using simple display screens, such as used for weight violation processing.

If a request does not relate to a simple transaction requiring only simple input (such as a weight violation), a "Tiny Direct Mode" interface may be invoked (step 307). The "Tiny Direct Mode" interface provides for context-sensitive prompting, allowing a range of supervisory functions to be executed using relatively simple input and display devices. FIG. 4 is a flowchart showing processing 400 that may be used in Tiny Direct Mode. Inputs required in the Tiny Direct Mode process 400 may be made using a keypad such as the 14-key keypad 700 (FIG. 7). Tiny Direct Mode compensates for the limited input capabilities of keypad 700 by displaying short, context-sensitive, text prompts to indicate functions that may be accessed at a particular stage in processing.

Keypad 700 may be a traditional keypad or a graphical keypad displayed on a touch screen. In one implementation, keypad 700 includes ten digit keys, as well as an "Enter," "Clear", "Void", and "Cancel" key. The "Enter" key confirms operations and can be used to exit Tiny Direct Mode, the "Clear" key can be used to clear the last entered number, the "Void" key can be used to accelerate frequent activities such as voiding items, and the "Cancel" key can be used to interrupt or cease operations in progress. Other variations of this keypad include, for example, labeling the keys in other languages, or providing labels in different languages on each of the keys.

Returning now to FIG. 4, when Tiny Direct Mode is invoked, the supervisor terminal displays the 14-key keypad shown in FIG. 4 as well as a lane number (shown in upper left corner 701) indicating the lane being serviced (step 401). Context information indicating to the supervisor the input that is required is also displayed (step 402). The context information may be a simple text string displayed in, e.g., the top right corner 702. The context information may be, for example, a simple text string such as "Enter PLU" when a produce look-up code is required for a non-barcoded item.

Keypad entry is then accepted (step 403) until either the "Enter" (step 404), "Cancel" (step 411), "Void" (step 412), or "Clear" (step 414) key is pressed, or a barcode is scanned (step 410). As digits are entered, they can be buffered by the terminal and displayed in the display area 702.

If the "Enter" key is pressed (step 404), the terminal determines whether any data (i.e., digits 0-9) was entered (step 405). If not, the terminal determines (based on the type of supervisory request) whether data entry is mandatory (step 406). If data entry is mandatory, a beep is emitted (steps 407) and input processing may be resumed at step 403. Otherwise the process 400 is ended and a cancel signal sent to the controller 122-126, 222.

If data is entered, or a barcode scanned (step 410), the system determines whether the data is valid in the context of processing the supervisory request. If the data is valid for the current context, the data is sent to the controller 122-125, 222 (step 409) and the simplified supervisory mode is terminated. If the data is not valid for the current context, a beep is emitted (step 407) and the interface returns to accept additional input (step 403). In some implementations, a scanned barcode (step 410) will supersede any data entered by keypad.

If the "Cancel" button is pressed (step 411), the simplified mode 400 is terminated. If the button pressed is "Void" (step 412), the message "Scan Item to Void" is displayed in the context information area 702 (step 413). If the "Clear" button is pressed, the number currently displayed in area 702 (entered by pressing the digit keys) is cleared, and the user resumes input (step 403).

Figure 8:
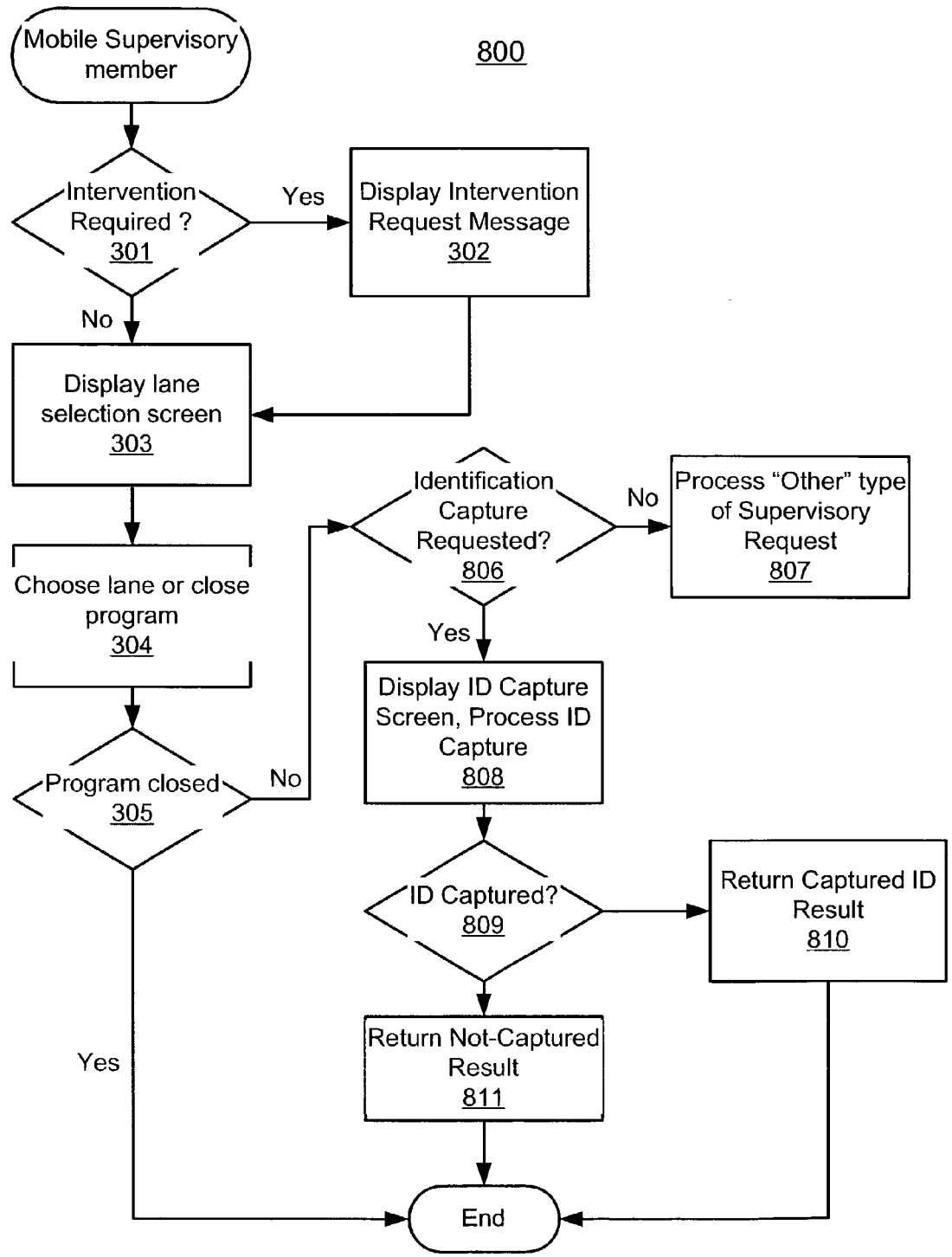
FIG. 8 shows a flow chart of a method for an identity capture process implemented using a mobile supervisory terminal.

FIG. 8 shows a data flow for a identity capture process implemented using a mobile supervisory terminal. The process 800 may be used, e.g., to complete a credit payment transaction requiring capture of a customer's signature or other customer identification. The process 800 may be initiated after the customer has self-checked items for purchase and has indicated that that payment for a purchase is to be made using a credit account.

The process 800 begins with the receipt of a supervisory request message at a mobile terminal. Steps 301-305 of FIG. 8 are directed to a lane selection operation and may be implemented in a manner that is substantially identical to that described with respect to steps 301-305 of FIG. 3. Following lane selection, the terminal determines whether the supervisory request message is related to identification capture (step 806). If the request was not for an identification capture, the terminal will proceed with other appropriate processing (step 807). For example, if appropriate, the terminal may proceed at the processing step 306 of FIG. 3.

Figure 9:
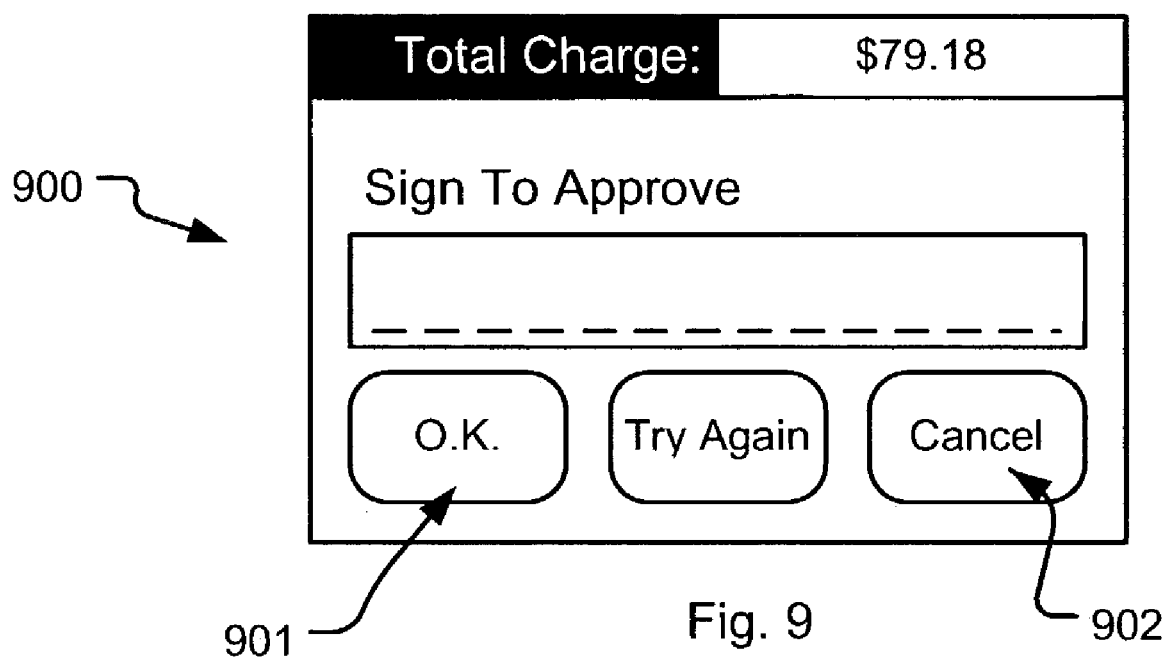
FIG. 9 shows an interface screen for use in the identity capture process of FIG. 8.

If a supervisory request is for an identification capture, an appropriate display or control interface is displayed (step 808). In the case of a signature capture, the interface may resemble the interface screen 900 of FIG. 9. The interface 900 allows a user to input a signature by writing on a touch-sensitive display screen. In the case of a video image identification, the terminal may include an miniature integrated video camera and the display screen may be a window showing a preview of a captured image. In the case of a fingerprint capture terminal, the interface may instruct a user to place a finger on a fingerprint sensor integrated with the terminal. Still other interfaces may be used.

If the customer identification data is successfully captured (e.g., as indicated by selecting the "O.K." button 901), the data can be returned to the store controller or the self checkout station (step 809-810). Upon successful receipt of the identification data, the controller may complete processing of the credit transaction and store the captured identification data in a database for future verification purposes (i.e., as proof of customer authorization). On the other hand, if the identification data was not successfully captured (e.g., due to a timeout or selection of the "cancel" button 902) (step 809, 811), a capture failure message is returned to the controller. The controller may then perform exception processing, such as requesting a different form of payment from the customer, displaying an alert message on a supervisory terminal, or re-initiating a capture operation at a different supervisory terminal.

Various changes and modifications to the processes 300, 400, 800 may be used. For example, the interface may return in all cases to accept more input instead of returning to normal operations, except when "Cancel" is pressed. Display of the weight violation screen 600 may be replaced by entry into the simplified supervisory mode 400 in a weight violation context. Thus, pressing "Enter" would authorize the scanned item and pressing "Cancel" would cause the mobile supervisory terminal interface to exit the simplified supervisory mode and to return to normal interface operation.

Various hardware and software components can be used to implement the systems 100, 200 and the claimed inventions. The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. Nevertheless, it will be understood that various modifications may be made without departing from the spirit and scope of the invention. For example, network interfaces 101, 201 connecting controller 122-126, 222 to supervisory terminals may use standard networks, such as Ethernet and IEEE 802.11b data networks, as well as proprietary networks and may also include multiple network types. Thus, other wired and/or wireless electrical connections (e.g. infrared, radio frequency, and others) and chip-level connections can be used. The controllers therefore, may have a number of connections of different types to accommodate all of the communication protocols among the supervisory terminals. Steps of processes 300, 400 may be performed in different orders, additional steps may be added, or some removed. Accordingly, other embodiments are within the scope of the claims.

What is claimed is:

1. A self-checkout system comprising:
a self-checkout station configured for customer-operated self-checkout of items for purchase;
a plurality of supervisory terminals comprising stored program instructions that configure the supervisory terminals to conduct supervisory activities controlling operation of the self-checkout station, at least one of the supervisory terminals being a mobile data terminal comprising a wireless network interface and a user identification capture interface; and
a controller operatively coupling the plurality of supervisory terminals to the self-checkout station and comprising stored program instructions to coordinate operation of the plurality of supervisory terminals to enable more than one of said supervisory terminals to conduct supervisory operations controlling operation of the self-checkout station, said controller further comprising stored program instructions that configure the controller to send data over a wireless network to the mobile terminal instructing the mobile terminal to initiate a user identification capture operation, said user identification capture operation being related to a self-checkout transaction.

2. The system of claim 1 wherein:
the self-checkout station is one of a plurality of self-checkout stations and the mobile terminal is operatively coupled to the plurality of self-checkout stations;
the data sent to the mobile terminal to initiate the user identification capture comprises data identifying at least one self-checkout station for which customer identification capture is to be performed.

3. The system of claim 2 wherein the user identification capture operation captures a user-identification comprising identification data other than an alpha-numeric keypad input.

4. The system of claim 3 wherein the user-identification further comprises an alpha-numeric keypad input.

5. The system of claim 3 wherein the user identification capture interface comprises a signature capture interface and the user identification data comprises a representation of a captured signature.

6. The system of claim 3 wherein the user identification capture interface comprises an interface selected from the group consisting of a biometric data capture interface and an image capture interface.

7. The system of claim 3 wherein initiating user identification capture comprises displaying on the mobile terminal a self-checkout station selection interface.

8. The system of claim 3 wherein:
the controller is one of a plurality of controllers;

each self-checkout station comprises a co-located one of the plurality of controllers; and each of the controllers is operatively coupled to the data terminal.

9. The system of claim 3, wherein:

the controller is a shared controller operatively coupled to each of the plurality of self-checkout stations; and the controller is configured to administer user identification capture for multiple ones of the plurality of self-checkout stations.

10. The system of claim 8, wherein:

the mobile data terminal is one of a plurality of supervisory terminals;

a first one of the supervisory terminals is operatively coupled to the controller by a wireless data network; and a second one of the supervisory terminals is operatively coupled to the controller by a wired data network.

11. The system of claim 2, wherein the mobile data terminal is a battery operated mobile supervisory device.

12. The system of claim 2 wherein the mobile data terminal comprises a card reader configured to clear a weight violation at the self-checkout station in response to a reading of an authorization card.

13. The system of claim 3, wherein:

the mobile data terminal and the controller interoperate to perform a plurality of supervisory functions associated with customer self-checkout at the self-checkout station;

the supervisory functions comprise processing of a payment transaction comprising a user identification capture operation.

14. The system of claim 13, wherein:

the payment transaction comprises a payment type selected from the group consisting of a credit card payment, a debit card payment, and an electronic funds transfer payment; and the user identification capture operation comprises receiving a signature input at the mobile data terminal.

15. The system of claim 1 wherein:

the controller comprises a processor operatively coupled to a program storage device comprising the stored program instructions.

* * * * *